R. SPENCER.
WATER OR BEARING HOOK FOR HARNESS.

No. 172,059. Patented Jan. 11, 1876.

Witnesses: Inventor:
E. N. Dickerson Jr. Rob. Spencer

UNITED STATES PATENT OFFICE.

ROBERT SPENCER, OF BROOKLYN, NEW YORK.

IMPROVEMENT IN WATER OR BEARING HOOKS FOR HARNESS.

Specification forming part of Letters Patent No. 172,059, dated January 11, 1876; application filed August 9, 1875.

*To all whom it may concern:*

Be it known that I, ROBERT SPENCER, of Brooklyn, county of Kings, State of New York, have invented certain new and useful Improvements in Water or Bearing Hooks; and I do hereby declare that the following is a full, clear, and exact description thereof, reference being had to the accompanying drawing and to the letters of reference marked thereon.

My invention relates to an improvement in the hooks through which the check-straps of harness pass, commonly known as water or bearing hooks. Many devices have already been patented to accomplish this object; but none of them have proved successful for the reason that the check-strap always works out of them and escapes.

The object of my invention is to make a water-hook of such a character that it is impossible for this rein to escape from it, and the strap is thoroughly confined.

Upon the center of the harness-saddle I screw firmly a hook, having its ends passing by and overlapping each other, so that the side of one end of the hook is opposite the side of the other end. This slit is turned toward the tail of the horse, and when the check-line has once been placed in position by no possible movement of the horse can it become detached. The check-line presses upon the lower forward part of the hook just above the stem, at the point of greatest resisting strength, as shown in Fig. 1.

The nature of my invention is clearly shown in the accompanying drawings.

Figure 1:
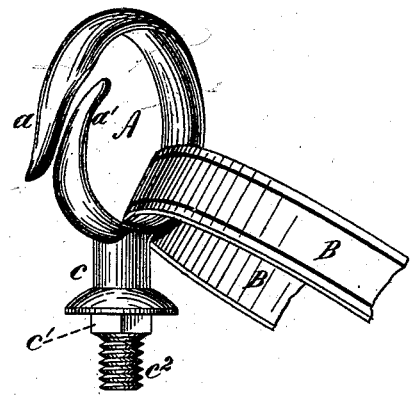
Figure 2:
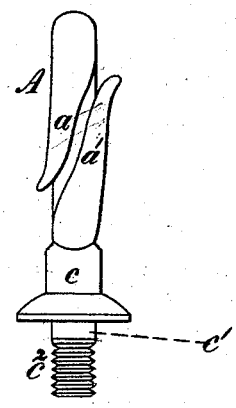

Figure 1 is a general view of my apparatus; Fig. 2, an end view of the same.

The check-line B B is pressed between the ends of the hook $a$ $a'$, and rests within the ring, and, excepting when carefully removed, cannot become detached. The water-hook A is supported on the stem $c$, which stem is provided with a bearing, as shown in the drawings. Under this bearing the stem is cut square, as is shown in Fig. 1, at $c^1$. Below upon this stem is cut a screw-thread, as shown at $c^2$, and in the harness-saddle a socket is placed, squared to correspond to the square rod $c^1$. A nut screwed upon $c^2$ draws this square block firmly into its bearing, and renders it impossible to turn or remove the water-hook A. This bearing, with its nut and stem, I consider an important part of my invention.

A check-strap placed in this hook can never become detached, and the many accidents rising from the slipping of the check-line are thus avoided.

What I claim as my invention, and desire to secure by Letters Patent, is—

1. A water-hook, A, with the laterally-lapping ends $a$ $a'$, substantially as described.

2. A slit water-hook, with laterally-overlapping ends, arranged with the square base $c^1$, and screw and nut $c^2$, to prevent turning or other movement, substantially as and for the purposes described.

ROBT. SPENCER.

Witnesses:
E. N. DICKERSON, Jr.,
JNO. R. LEFFERTS.